(12) United States Patent
Ackerman et al.

(10) Patent No.: US 7,604,148 B2
(45) Date of Patent: Oct. 20, 2009

(54) DEVICE FOR REDUCING THE TENSION ON AN ELASTOMERIC FEED

(75) Inventors: Scott Edward Ackerman, Brunswick, OH (US); Christopher David Dyrlund, Canton, OH (US); Gary Robert Burg, Massillon, OH (US); Brian Richard Koch, Hartville, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 314 days.

(21) Appl. No.: 11/599,773

(22) Filed: Nov. 15, 2006

(65) Prior Publication Data

US 2008/0111016 A1 May 15, 2008

(51) Int. Cl.
*B65H 20/00* (2006.01)

(52) U.S. Cl. .................................................. 226/156

(58) Field of Classification Search ............... 226/1, 226/8, 24, 44, 115, 156, 157, 167, 158, 159, 226/152, 112, 160, 117, 164, 118.1, 118.2, 226/118.3, 29, 124, 194; 366/76.1, 76.2, 366/76.93; 425/145, 135; 264/40.7, 211.21; 242/418, 418.1, 564.4

See application file for complete search history.

(56) References Cited

U.S. PATENT DOCUMENTS

| 3,841,818 | A | | 10/1974 | Forschner | 425/376 |
| 3,870,214 | A | * | 3/1975 | Schmid | 226/34 |
| 4,247,272 | A | | 1/1981 | Anders | 425/147 |
| 4,609,396 | A | * | 9/1986 | Fawzi | 504/235 |
| 4,744,930 | A | | 5/1988 | Twist et al. | 264/40.2 |
| 5,935,377 | A | | 8/1999 | Sergel et al. | 156/406.4 |
| 5,975,395 | A | * | 11/1999 | Takada et al. | 226/162 |
| 2004/0221700 | A1 | * | 11/2004 | Williams et al. | 83/236 |

FOREIGN PATENT DOCUMENTS

DE 2458599 12/1974
GB 1421679 3/1974

OTHER PUBLICATIONS

European Search Report completed Feb. 26, 2008.

\* cited by examiner

*Primary Examiner*—John Q. Nguyen
*Assistant Examiner*—William E Dondero
(74) *Attorney, Agent, or Firm*—June E. Rickey

(57) ABSTRACT

A method and device is provided for reducing the tension on an elastomeric feed strip. The method includes providing a device for engagement with the feed strip, pushing the feed strip forward by the device when the feed strip stops or when the tension exceeds a certain value, and then pushing the strip in the direction of travel.

3 Claims, 3 Drawing Sheets

DEVICE FOR REDUCING THE TENSION ON AN ELASTOMERIC FEED

FIELD OF THE INVENTION

The invention relates to reducing the tension of a feed strip, and more particularly to reducing the tension of a elastomeric feed strip into an extruder.

BACKGROUND OF THE INVENTION

Gear pump extruders are used in the tire industry to extrude rubber components. A large feed strip of rubber is typically fed into a feed box of an extruder. The feed strip of rubber entering the feed box is typically held in tension by a weighted roller. In some cases, a gear pump extruder may run intermittently. When the extruder stops, there is tension on the feed strip of material from the roller. If the tension is too great, the hot rubber/metal in the feedbox of the extruder can cause the feed strip to break. If the strip breaks, it can cause a production error or extruder stoppage or even an incorrect output from the extruder/gear pump until the feed strip is refed into the feed box. Thus it is desired to have an improved feed system without the aforementioned disadvantages.

SUMMARY OF THE INVENTION

The invention provides in a first aspect a method of reducing the tension on an elastomeric feed strip of an extruder system, the method includes providing a device for engagement with the feed strip, and pushing the feed strip forward by the device when the feed strip stops its forward motion. The device may comprise a roller having a one way bearing or a support plate.

A tension reducing device for engagement with a feed strip the device includes: a support frame having one or more support legs, wherein the support frame may move from a first position to a second position different than said first position, wherein the tension reducing device further comprises a feed strip engagement device for engaging the feed strip and pushing the feed strip forward in the same direction of travel to thereby reduce the tension of the feed strip.

BRIEF DESCRIPTION OF THE DRAWINGS

The invention will be described by way of example and with reference to the accompanying drawings in which.

DETAILED DESCRIPTION OF THE INVENTION

Figure 1:
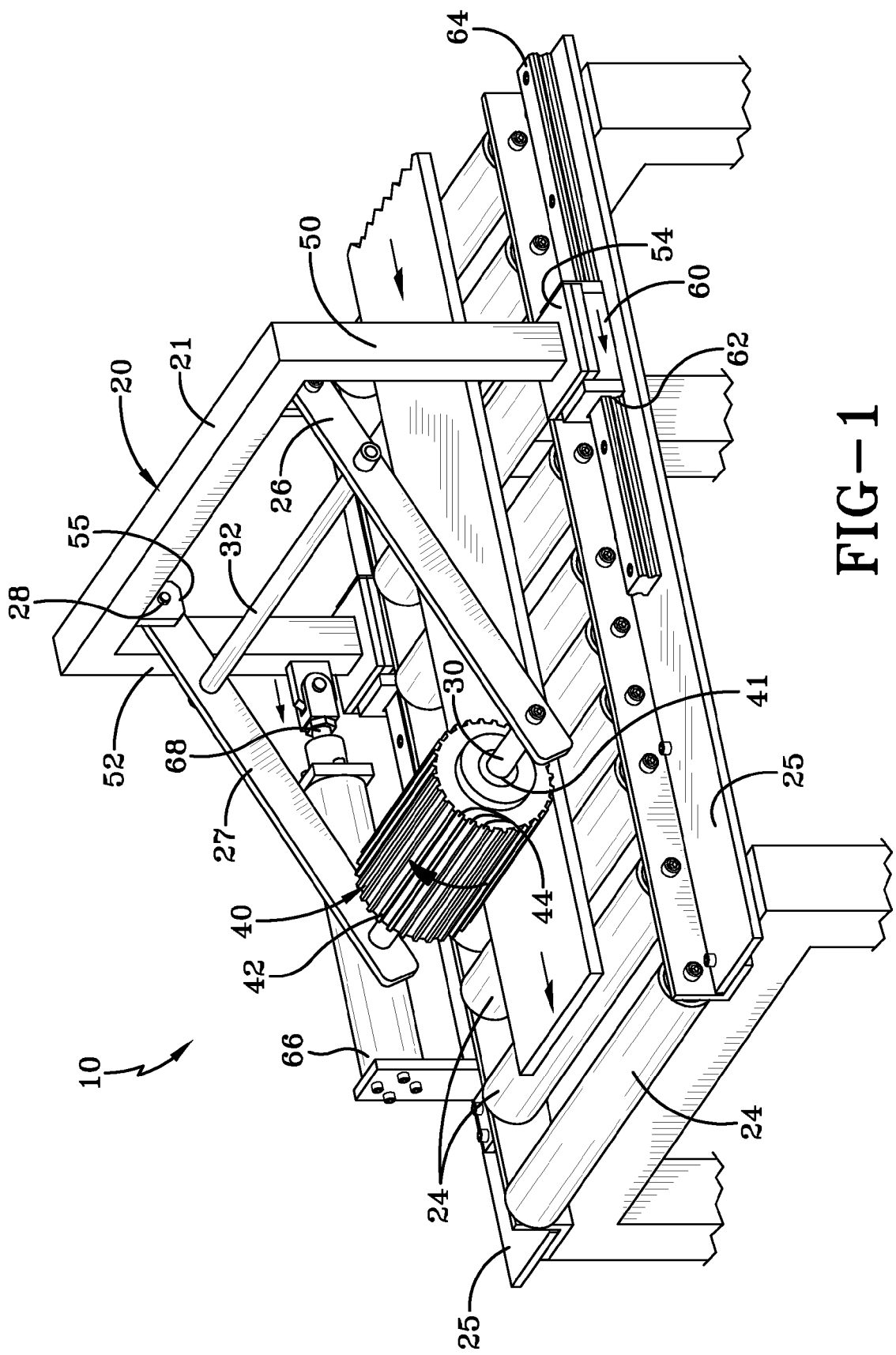
FIG. 1 is a perspective view of a feed strip device of the present invention.

A feed strip tension-reducing device 10 is shown in FIG. 1. The feed strip device is suitable for use in conjunction with an extruder or other device requiring a feed strip of elastomer or rubber. The feed strip device 10 functions to release the tension in a feed strip of elastomer by pushing the strip forward as described below.

The feed strip tension-reducing device 10 comprises a support frame 20 which is generally oriented across or perpendicular to the direction of travel of a conveyor system 22. The conveyor system typically comprises a plurality of rollers 24 mounted in parallel relationship, forming a conveyor system for transporting an elastomeric strip to an extruder or other device. A conveyor belt (not shown) may also be used instead of the rollers.

The support frame 20 includes an upper reinforcement bar 21 which joins support legs 50, 52. The support legs 50, 52 are mounted on opposed side rails 25 of the conveyor system. The upper reinforcement bar 21 further includes two opposed flanges 55 for pivotally connecting ends of two support rails 26, 27 by pins 28.

Mounted between support rails 26, 27 are one or more crossbars 30, 32. Centered in lower cross bar 30 is a roller 40 which is rotatably mounted to the cross bar 30. The roller 40 has an outer driving surface 42 which may comprise optional grooves 44 thereon. Internal to roller 40 is a one way bearing 41 which will only allow rotation of the roller 40 in one direction. The roller can only rotate with the feed strip, i.e., in the same direction of travel as the feed strip. Roller 40 engages the feed strip, rotating with the feed strip during extruder operation.

Figure 2:
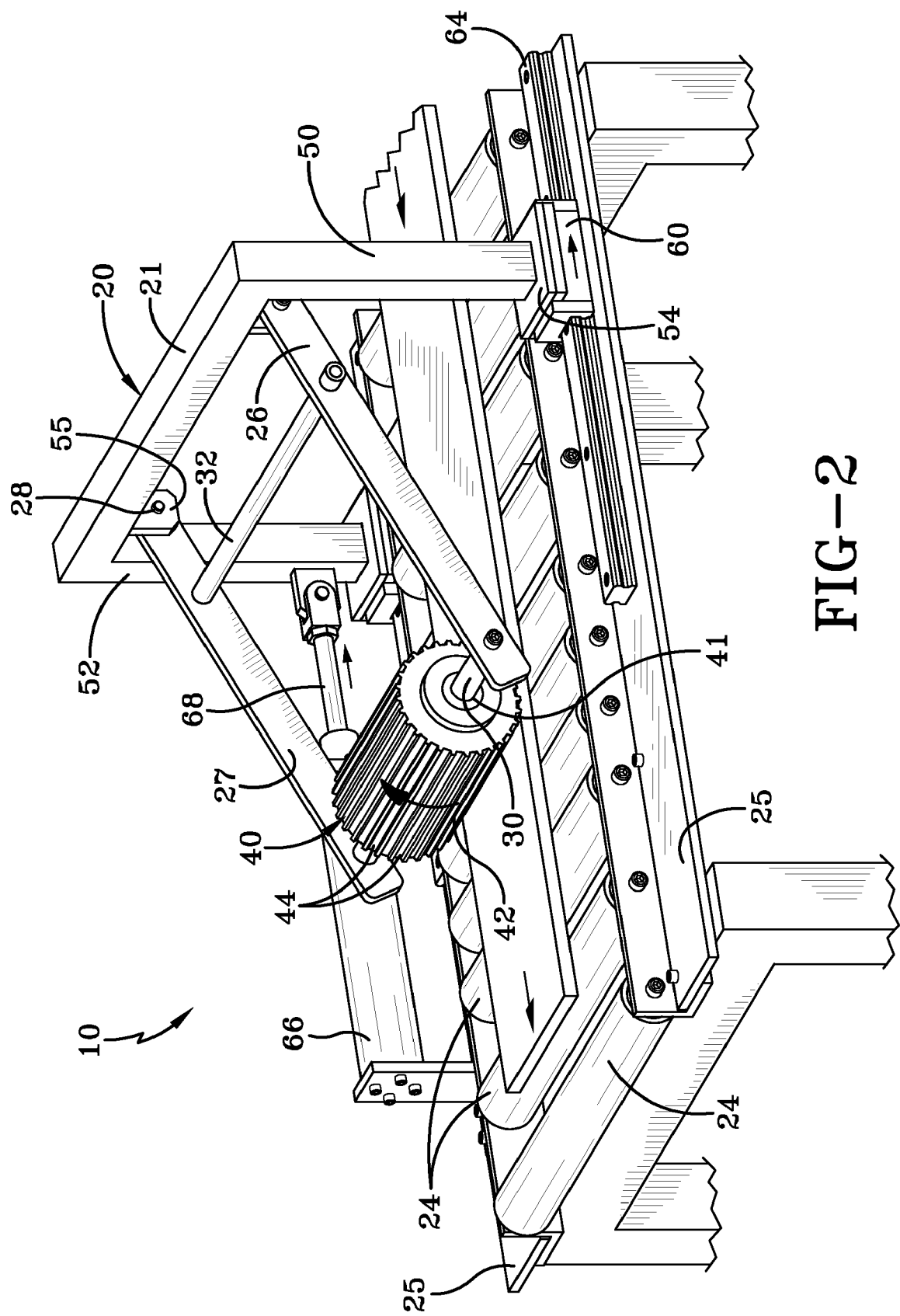
FIG. 2 is a side view of the feed strip device of FIG. 1.

The frame side support legs 50, 52 have flanged ends 54 which are mounted upon slidable blocks 60. Blocks 60 further comprise an interior channel 62 for slidably receiving a rail 64 therein. Thus the entire support frame 20 may slide forward and aft upon rails 64. The support frame 20 is further connected to a pneumatic or hydraulic mechanism 66 having a retractable arm 68. The retractable arm is connected to the lower support leg 52. Thus the hydraulic mechanism extends and retracts arm 68 causing the support frame to slide backwards and forwards on the support rails. FIG. 2 illustrates the support frame assembly in a retracted position. As further shown in FIG. 2, the hydraulic arm is fully extended when the support frame is in the fully retracted position. FIG. 1 illustrates the hydraulic arm in the retracted position, after moving the support frame assembly to the fully forward position. The hydraulic arm operation may be controlled by a system PLC controller (not shown) which instructs the hydraulic arm to retract to the retracted position when the extruder gear pump is idled or turned off. When the hydraulic arm retracts, the support frame is slid forward on support rails (in the same direction of travel as the feed strip), wherein the support roller 40 pushes the feed strip forward, thereby reducing the tension of the feed strip. The tension of the strip is reduced enough to prevent the strip from breaking. The system controller then instructs hydraulic arm to fully extend, returning the feed strip tension reducing device 10 to the start or retracted position.

Figure 3:
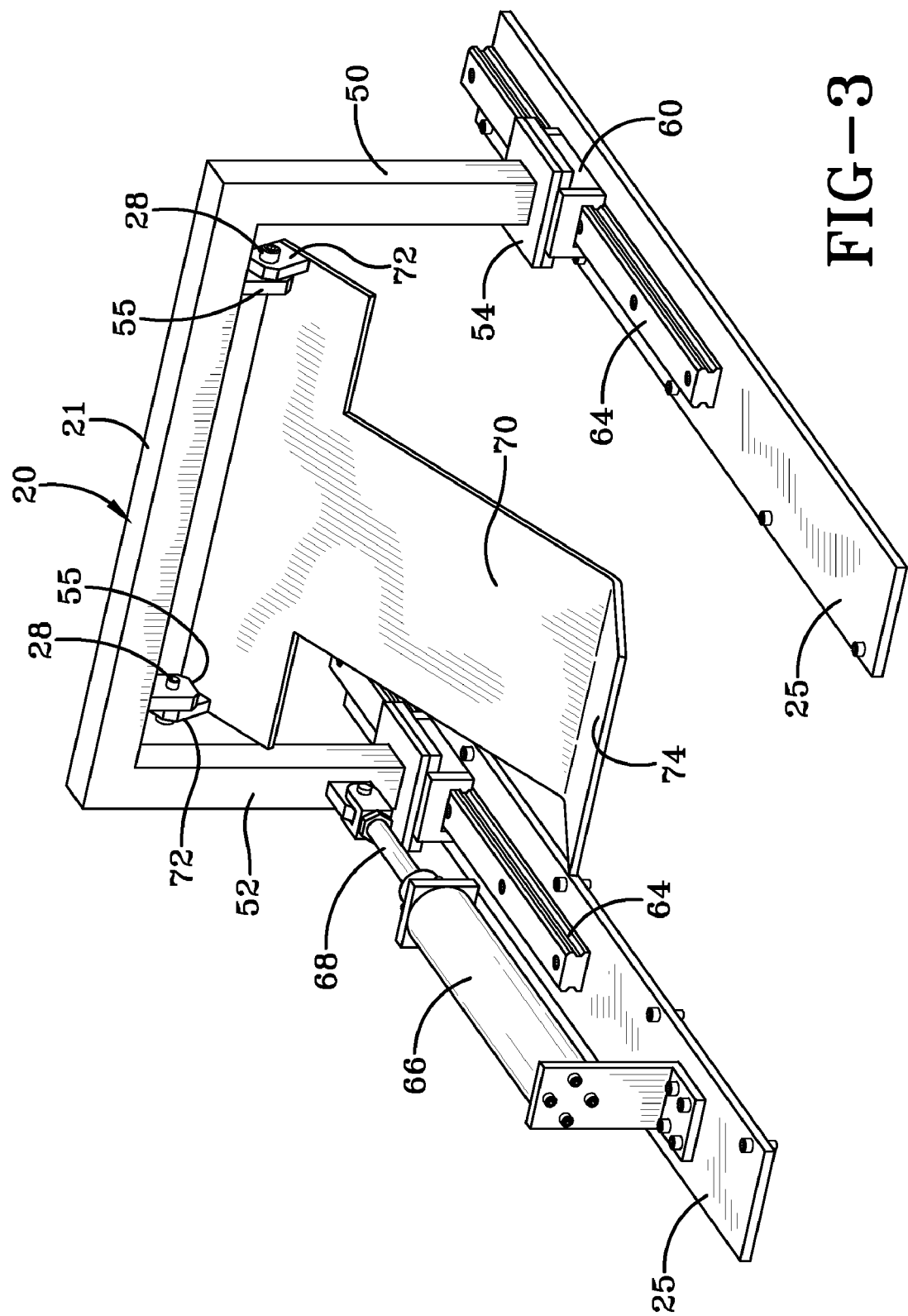
FIG. 3 is an alternative embodiment of a feed strip device of the present invention.

FIG. 3 illustrates an alternative embodiment of a tension-reducing device. All of the components are as described above, except that the roller 40 and support rails 26, 27 are replaced with a support plate 70. The support plate 70 has tabular ends 72 which are pivotally connected to flanges 55 of support bar 21 via pins 28. Support frame 20 has an angled, distal end 74 which is positioned for engagement with the feed strip. The support frame 20 may comprise any desired shape, and is not limited to the T shape as illustrated. The distal end 74 rides along the feed strip. When the extruder gear pump is idled or turned off, the hydraulic arm 68 retracts, sliding the support frame 20 forward on support rails (in the same direction of travel as the feed strip), wherein the support plate 70 engages the strip and pushes it forward, thereby reducing the tension of the feed strip. The tension of the strip is reduced enough to prevent the strip from breaking. The system controller then instructs hydraulic arm to fully extend, returning the feed strip tension reducing device 10 to the start or retracted position.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. A method of reducing the tension on an elastomeric feed strip of an extruder system, the method comprising the steps of:
    providing a device for engagement with the feed strip, wherein the device further comprises a support frame connected to a hydraulic mechanism for moving the support frame, wherein the support frame is slidably mounted to support rails, and said hydraulic mechanism has a retractable arm connected to the support frame; wherein the device further comprises a roller mounted on the frame having a one-way rotation bearing;
    pushing the feed strip forward by the roller after the forward motion of the feed strip stops.

2. A method of reducing the tension on an elastomeric feed strip of an extruder system, the method comprising the steps of:
    providing a device for engagement with the feed strip, monitoring the tension of the feed strip;
    the device comprises a roller having a one-way-rotation bearing, wherein the device further comprises a support frame support the roller and connected to a hydraulic mechanism for moving the support frame, wherein the support frame is slidably mounted to support rails, and the hydraulic mechanism has a retractable arm connected to the support frame; and
    pushing the feed strip forward by the roller when the tension exceeds a certain level.

3. A tension reducing device for engagement with a feed strip the device comprising: a support frame having one or more support legs, wherein the support frame may move from a first position to a second position different than said first position, wherein the tension reducing device further comprises a feed strip engagement device for engaging the feed strip and pushing the feed strip forward in the same direction of travel to thereby reduce the tension of the feed strip, the feed strip engagement device comprises a roller in contact with the feed strip and the roller having a one-way-rotation bearing, wherein the device further comprises a support frame supporting the roller and connected to a hydraulic mechanism for moving the support frame, wherein the support frame is slidably mounted to support rails, and said hydraulic mechanism has a retractable arm connected to the support frame.

* * * * *